(12) United States Patent
Seo et al.

(10) Patent No.: US 6,778,219 B1
(45) Date of Patent: Aug. 17, 2004

(54) THREE-DIMENSIONAL IMAGE CAPTURING DEVICE

(75) Inventors: Shuzo Seo, Saitama (JP); Nobuhiro Tani, Tokyo (JP); Shinichi Kakiuchi, Saitama (JP)

(73) Assignee: PENTAX Corporation, Tokyo (JP)

( * ) Notice: Subject to any disclaimer, the term of this patent is extended or adjusted under 35 U.S.C. 154(b) by 699 days.

(21) Appl. No.: 09/717,211

(22) Filed: Nov. 22, 2000

(30) Foreign Application Priority Data

Nov. 24, 1999 (JP) ........................................ P11-332843

(51) Int. Cl.[7] .............................................. H04N 5/232
(52) U.S. Cl. ..................................... 348/348; 348/370
(58) Field of Search ................................ 348/348, 370, 348/371, 349, 314, 207–99; 382/154, 106; 396/80, 89; 356/5.03, 5.01

(56) References Cited

U.S. PATENT DOCUMENTS

| 4,686,572 A | 8/1987 | Takatsu |
| 6,057,909 A | 5/2000 | Yahav et al. |
| 6,437,853 B2 * | 8/2002 | Seo ........................... 356/5.01 |
| 2003/0043287 A1 * | 3/2003 | Kakiuchi et al. ........... 348/269 |

FOREIGN PATENT DOCUMENTS

JP        4-351074        12/1992

OTHER PUBLICATIONS

Christie et al., "Design and Development of a Multi–detecting Two–dimensional Ranging Sensor", Measurement Science Technology, vol. 6, pp. 1301–1308, 1995.

* cited by examiner

*Primary Examiner*—Aung Moe
(74) *Attorney, Agent, or Firm*—Greenblum & Bernstein, P.L.C.

(57) ABSTRACT

A three-dimensional image capturing device obtains distance information of a standard subject, to which the distance from the device to each point of a surface of the standard subject is known. Based on the distance information of the standard subject, correction data is sensed, which is an error of distance information sensed when using a measurement subject, to which the distance from the device to each point of a surface of the standard subject is unknown. A distance measurement is performed for the measurement subject, so that distance information is obtained. The distance information of the measurement subject is corrected using the correction data.

8 Claims, 12 Drawing Sheets

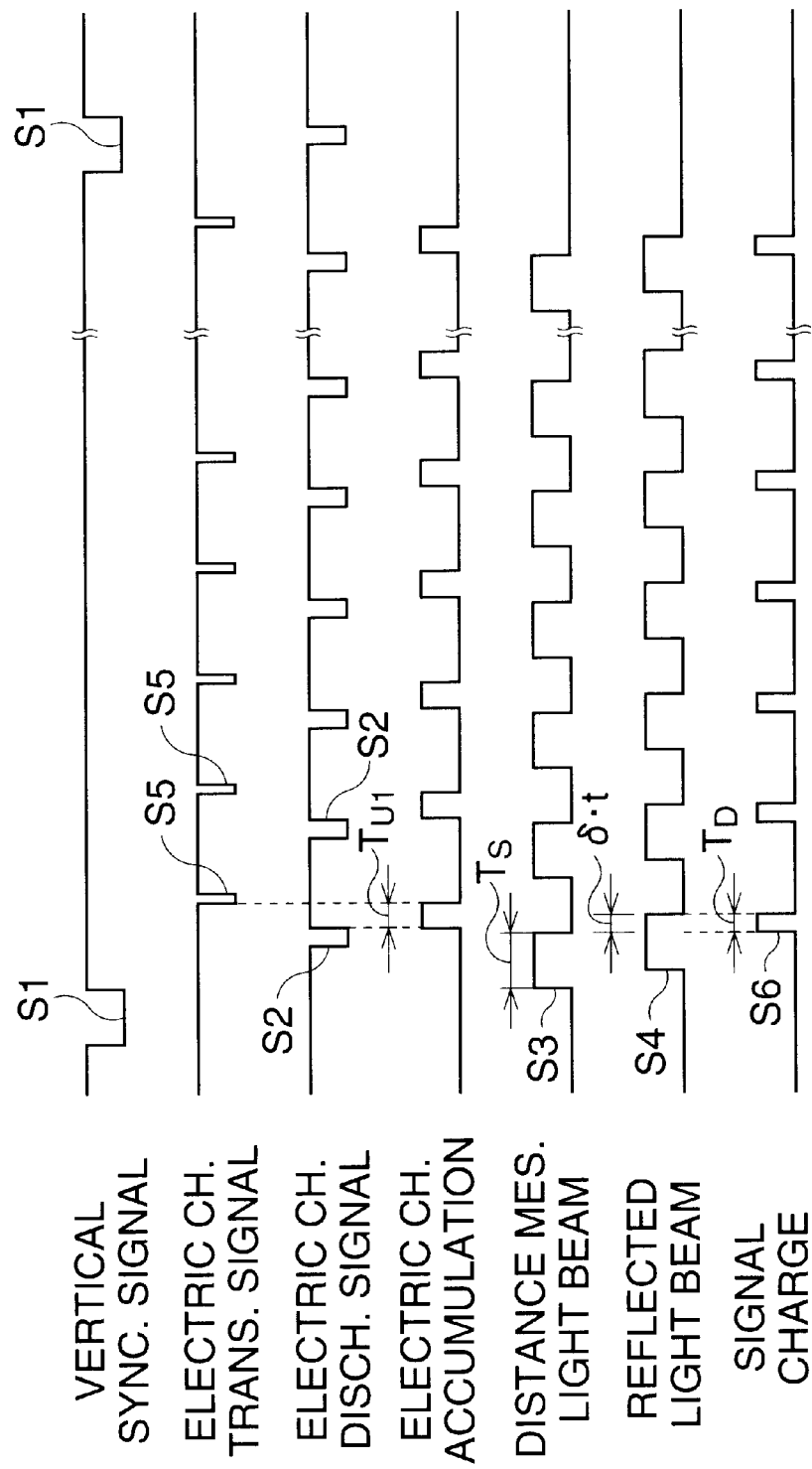

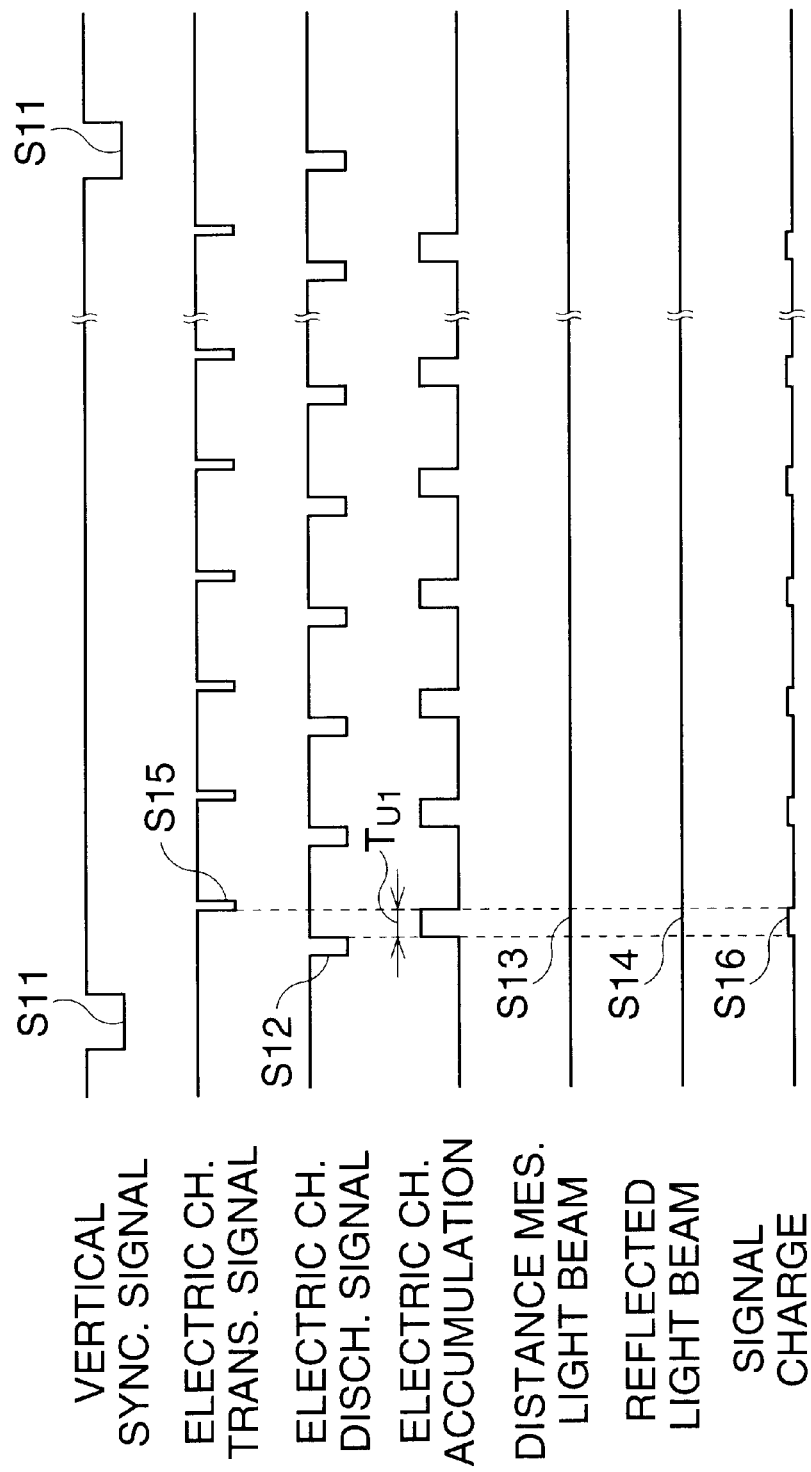

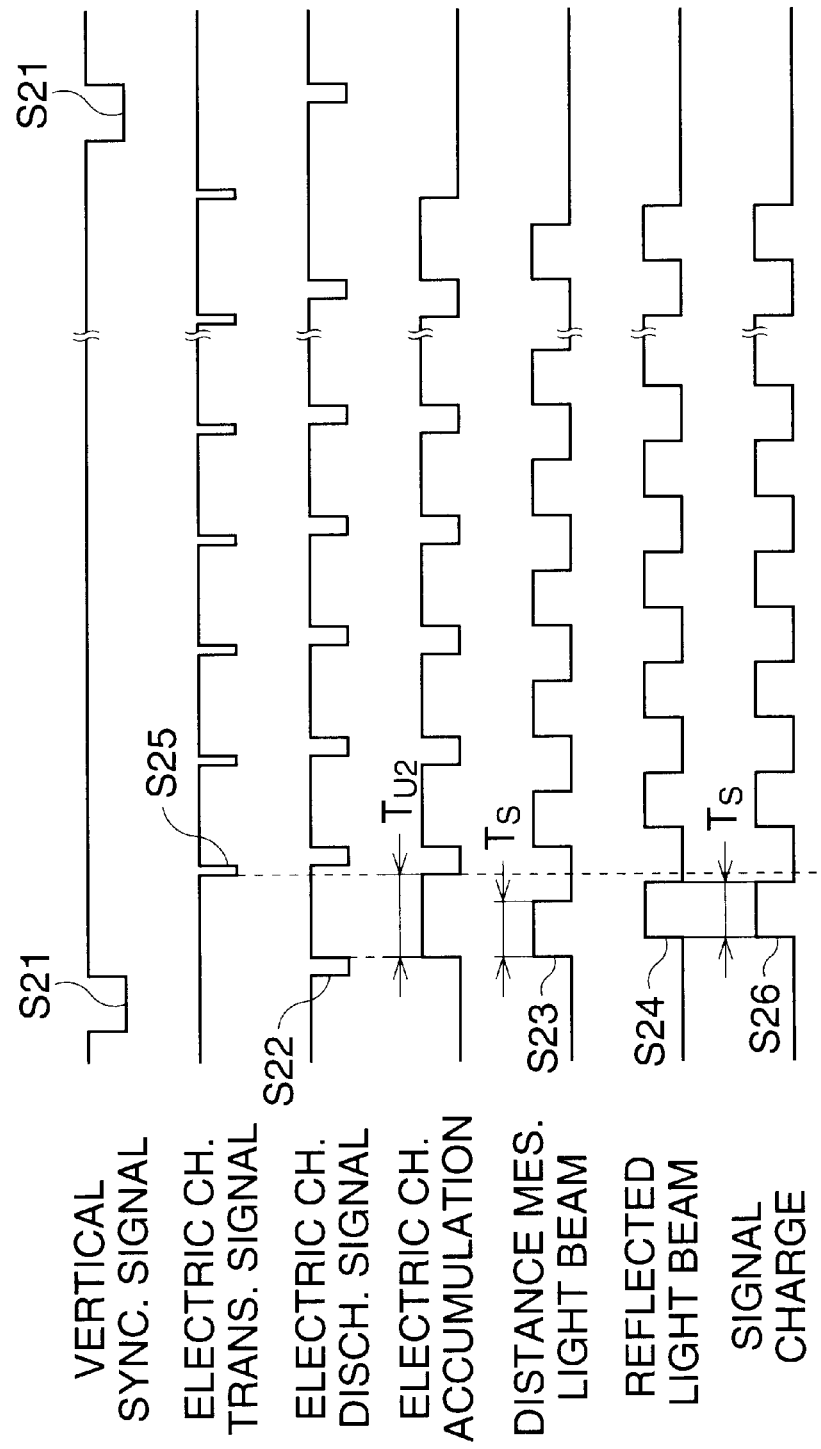

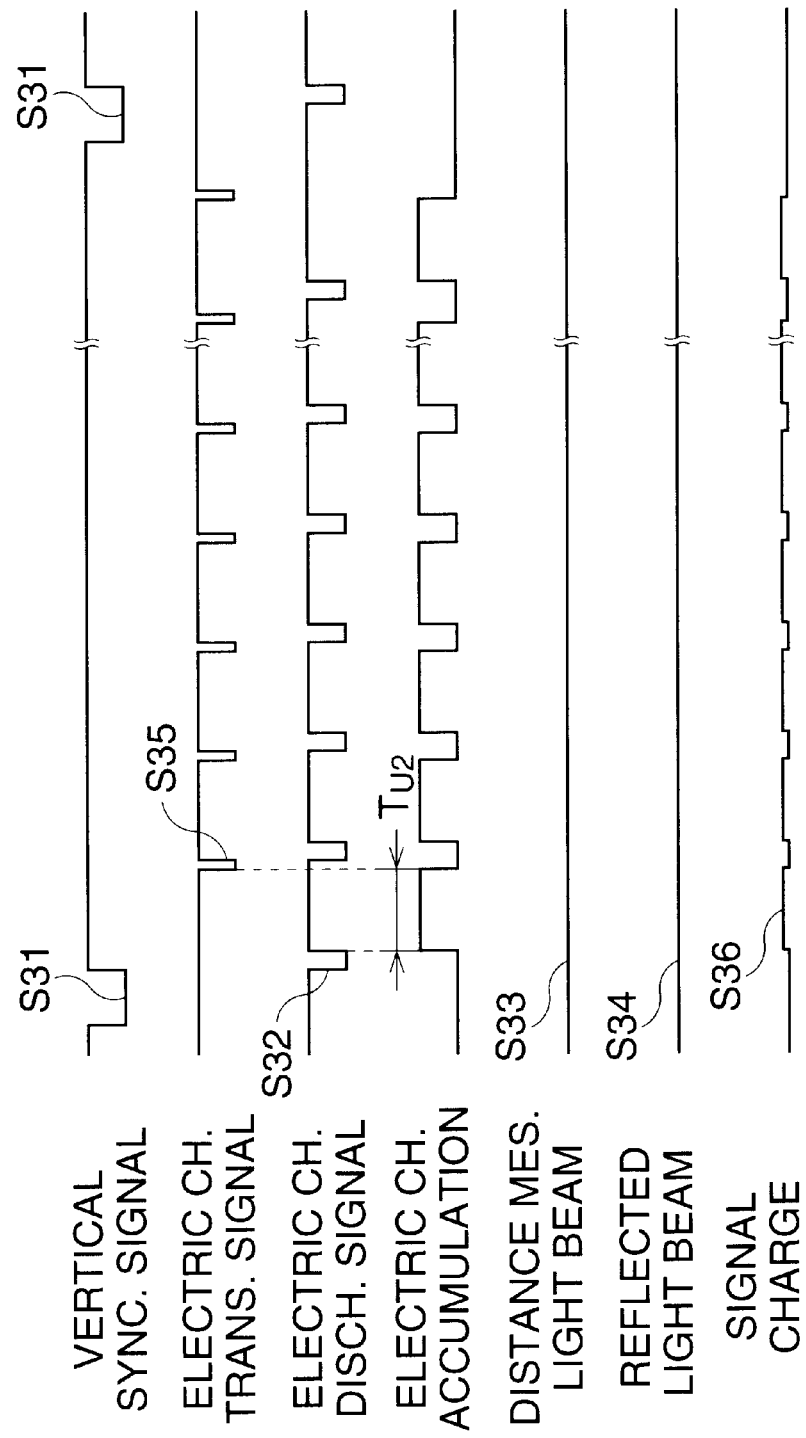

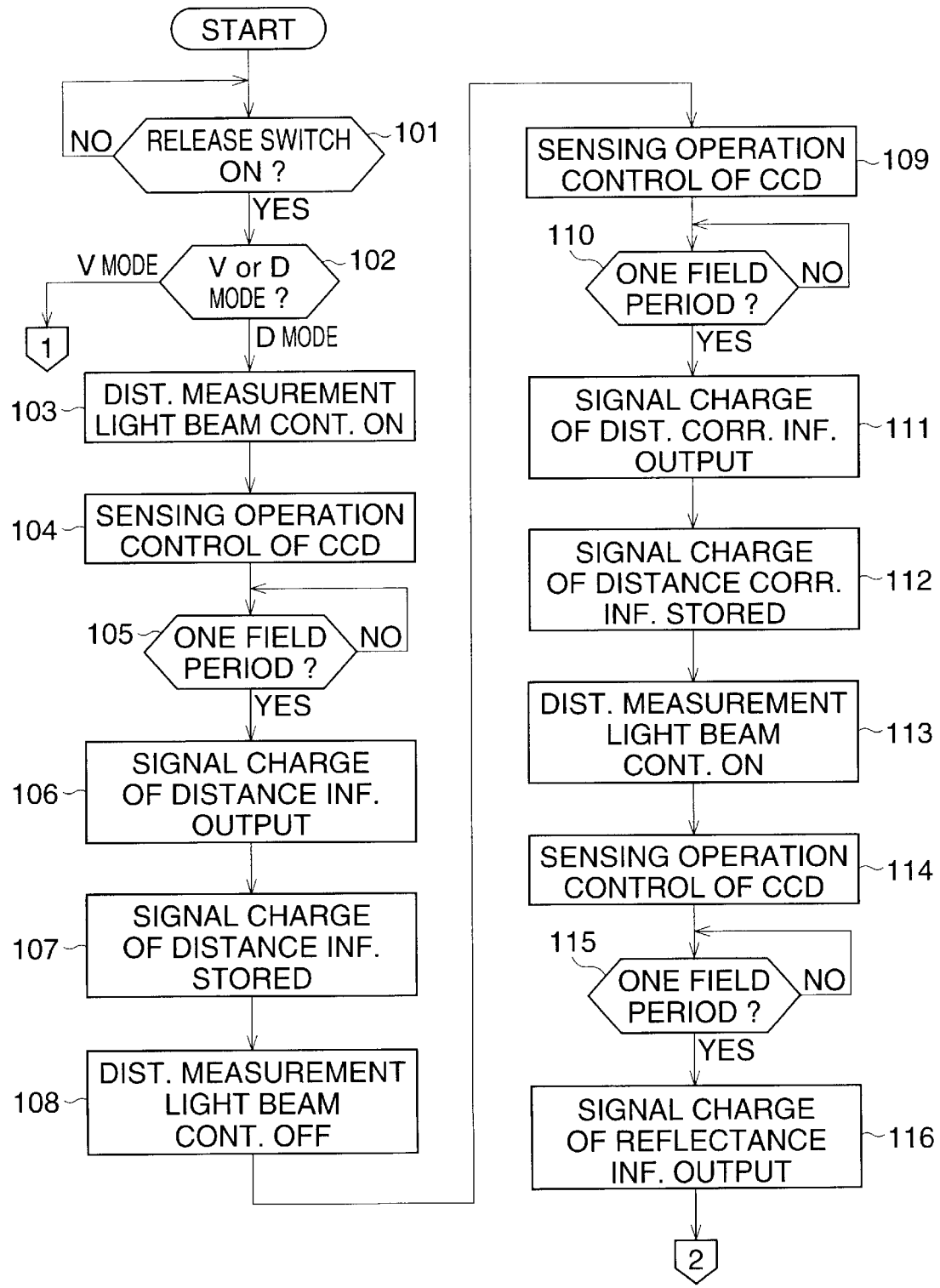

THREE-DIMENSIONAL IMAGE CAPTURING DEVICE

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

A three-dimensional measurement using a three-dimensional image capturing device is classified as an active system, in which light, an electric wave or sound is radiated onto a measurement subject, and a passive system in which the light, electric wave or sound is not output. The active system comprises the time-of-flight measurement, a phase detection using a modulated light wave, a triangulation, a moiré topography, and so on, and the passive system comprises a stereo vision system, and so on.

An active system device is very bulky in comparison with that of the passive system, since the device requires a laser beam output mechanism. However, the active system device is superior regarding a distance measurement resolution, a measuring time, a measuring range and soon, and thus, despite the bulkiness, the device is utilized in various fields. In a three-dimensional image capturing device, described in "Measurement Science and Technology" (S. Christies et al., vol.6, p.1301–1308, 1995), a pulse-modulation laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from the measurement subject, which is positioned far from the device, is less than that of received light based on a reflected light beam from a measurement subject, which is close to the measurement subject, an output corresponding to a distance between the measurement subject and the device can be obtained for each pixel of the CCD.

SUMMARY OF THE INVENTION

Therefore, an object of the present invention is to provide a three-dimensional image capturing device by which a three-dimensional shape of a measurement subject is sensed with high accuracy.

According to the present invention, there is provided a three-dimensional image capturing device, comprising a light source, a plurality of photoelectric conversion elements, a signal charge holding unit, an electric charge discharging processor, a signal charge transfer processor, signal charge integrating processor and an error sensing processor.

The light source irradiates a distance measuring light beam to a standard subject, to which the distance from the device to a surface of the standard subject is known, and a measurement subject, to which the distance from the device to a surface of the measurement subject is unknown. The distance measuring light beam is a pulsed beam and the measurement subject reflects the distance measuring light beam to generate a reflected light beam pulse. The plurality of photoelectric conversion elements receive the reflected light beam pulse from the standard subject and the measurement subject, so that an electric charge corresponding to an amount of the received reflected light beam is accumulated in each of the photoelectric conversion elements. The signal charge holding unit is disposed adjacent to each of the photoelectric conversion elements. The electric charge discharging processor discharges unwanted charge accumulated in each of the photoelectric conversion elements, so that an accumulating operation of signal charge is started in each of the photoelectric conversion elements. The signal charge transfer processor transfers the signal charge accumulated in the photoelectric conversion elements to the signal charge holding unit. The signal charge integrating processor drives the electric charge discharging processor and the signal charge transfer processor alternately to integrate the signal charge in the signal charge holding unit, so that distance information, corresponding to the distance from the device to the surface of each of the standard subject and the measurement subject, is sensed. The error sensing processor senses an error of the distance information to the measurement subject, based on the signal charge integrated in the signal charge integrating processor when using the standard subject.

BRIEF DESCRIPTION OF THE DRAWINGS

The objects and advantages of the present invention will be better understood from the following description, with reference to the accompanying drawings in which:

FIG. 7 is a timing chart of a distance information sensing operation;

FIG. 8 is a timing chart of a distance correction information sensing operation;

FIG. 9 is a timing chart of a reflectance information sensing operation;

FIG. 10 is a timing chart of a reflectance correction information sensing operation;

FIGS. 11A and 11B show a flowchart of the distance information sensing operation;

DESCRIPTION OF THE PREFERRED EMBODIMENTS

Figure 1:
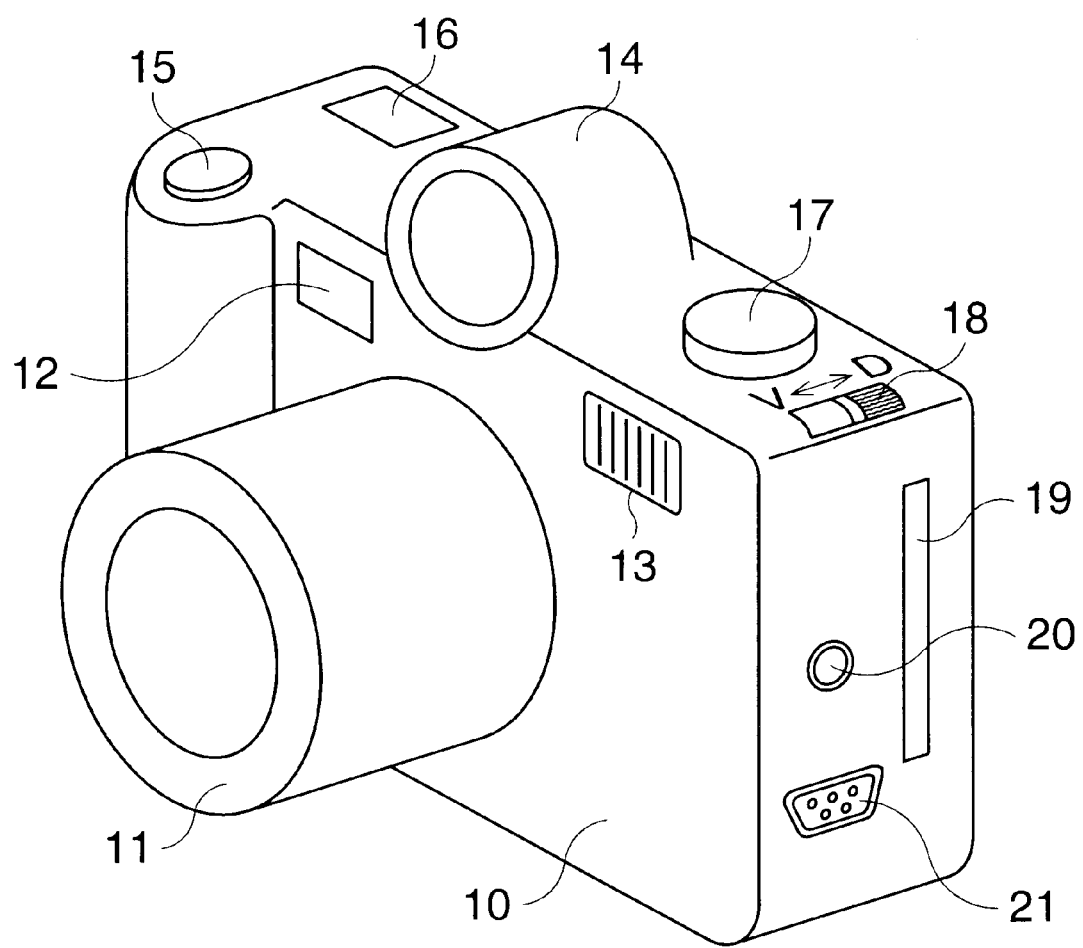
FIG. 1 is a perspective view showing a camera provided with a three-dimensional image capturing device of an embodiment of the present invention.

The present invention will be described below with reference to the embodiments shown in the drawings.

FIG. 1 is an external view of a camera having a three-dimensional image capturing device of an embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
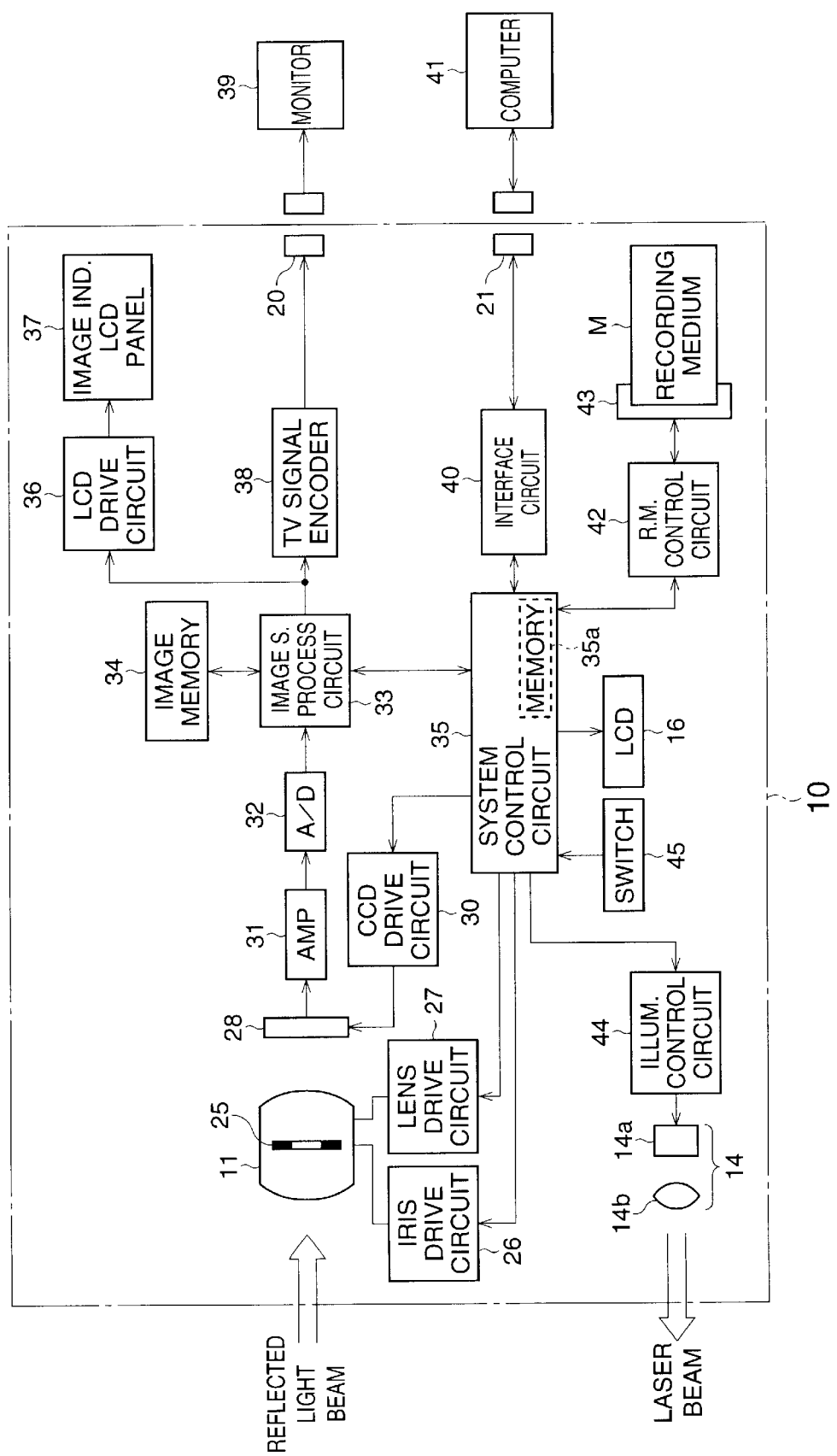
FIG. 2 is a block diagram showing an electrical construction of the camera shown in FIG. 1.

FIG. 2 is a block diagram showing an electrical construction of the camera shown in FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34 can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A luminous-flux emitting control circuit 44 is connected to the system control circuit 35. The light emitting device 14 is provided with a luminous-flux emitting element 14a and an illumination lens 14b, and an operation of the luminous-flux emitting element 14a is controlled by the luminous-flux emitting element control circuit 44. The luminous-flux emitting element 14a radiates a laser beam, which is a distance measuring light bean, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later. Note that, in the sensing operation of the three-dimensional image, a control of a transferring operation and so on, in the CCD 28, is performed by the system control circuit 35 and the CCD drive circuit 30.

The liquid crystal display panel 16 and a switch group 45, including the release switch 15, the mode change dial 17 and the V/D mode switch 18, are connected to the system control circuit 35. A memory 35a is provided in the system control circuit 35 so that correction data is stored in a distance information sensing process described later with reference to FIG. 14.

Figure 3:
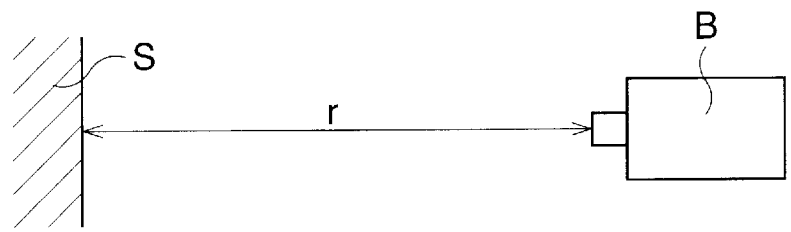
FIG. 3 is a view showing a principle behind a distance measurement.
Figure 4:
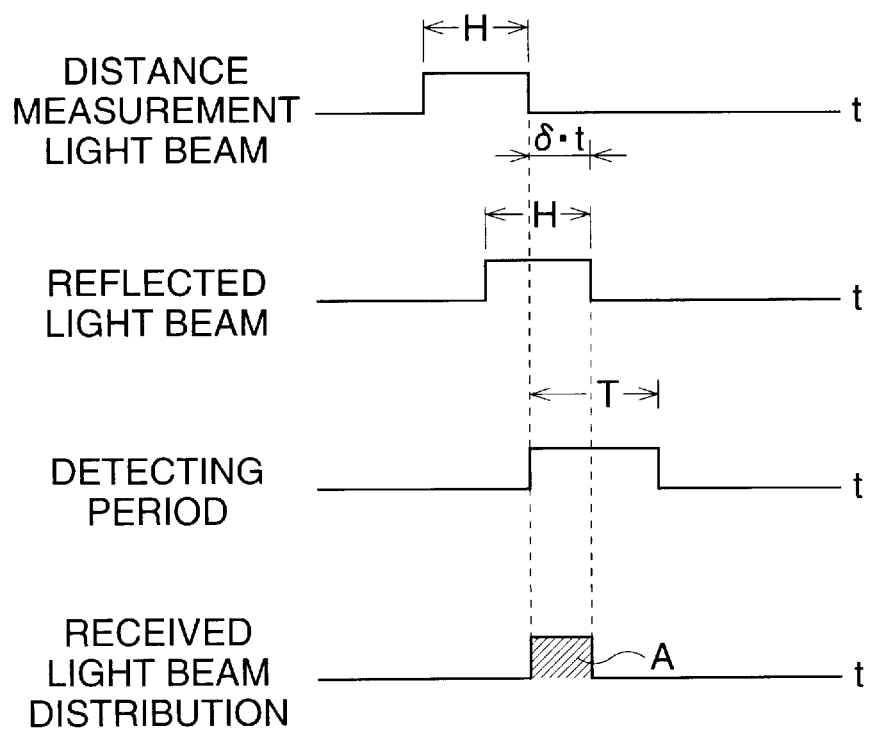
FIG. 4 is a timing chart showing a distance measuring light beam, a reflected light beam, a gate pulse and a distribution of an amount of a light beam received by a CCD.

With reference to FIGS. 3 and 4, a principle behind a distance measurement in the embodiment is described below. Note that, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a fall of the pulse of the reflected light beam occurs after a fall of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C/2 \tag{1}$$

wherein "C" is the velocity of light.

For example, by setting a condition in such a manner that the reflected light beam can only be sensed from a fall of the pulse of the distance measuring light beam to a point after a fall of the pulse of the reflected light beam so as to sense a component containing the fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the greater the received light amount A.

In this embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
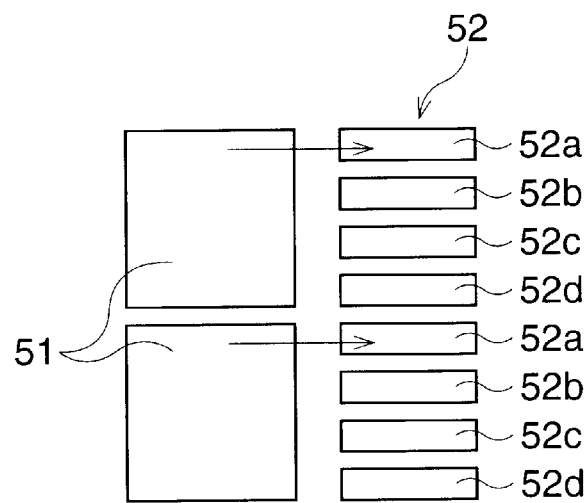
FIG. 5 is a plan view showing a disposition of photodiodes and a vertical transfer unit, which are provided in the CCD.
Figure 6:
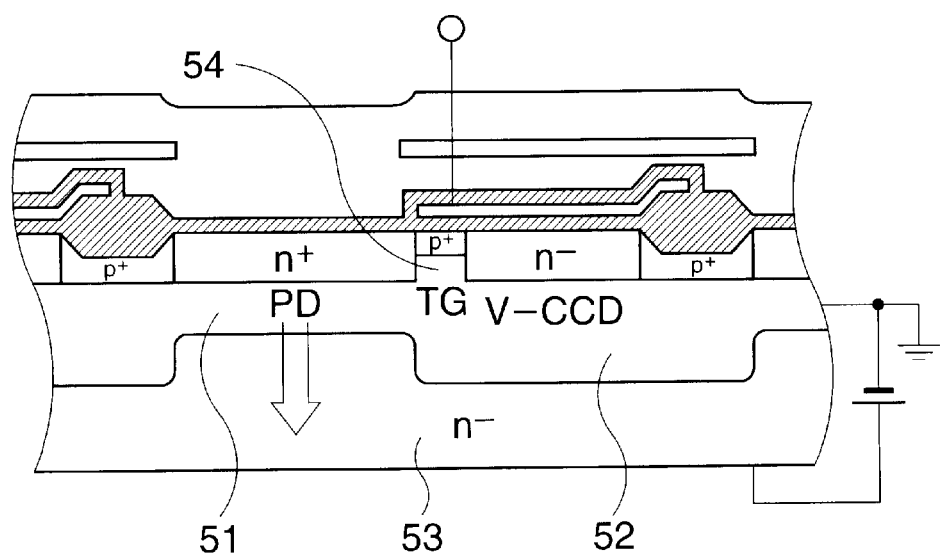
FIG. 6 is a sectional elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overview drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that the number of vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and the amount of the electric charge corresponds to an amount of an incident light beam, which is the reflected light beam reflected by the measurement subject. When the substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electric shuttering operation is performed.

FIG. 7 is a timing chart of a distance information sensing operation by which data, corresponding to the distance from the camera body 10 to each point on a surface of the measurement subject, is sensed. The distance information sensing operation is described below with reference to FIGS. 1, 2, 5, 6 and 7.

In synchronization with an output of a vertical synchronizing signal S1, the light emitting device 14 is actuated, and thus a distance measuring light S3, which is a pulsed beam having a constant width, is output therefrom. The distance measuring light S3 is reflected by the measurement subject, and enters the CCD 28 as a reflected light beam S4. In synchronization with a timing at which the output of the distance measuring light S3 is completed, an electric charge discharging signal (a pulse signal) S2 is output. The output of the electric charge discharging signal S2 is controlled to terminate at the same time the output of the distance measuring light S3 is complete. Due to this, unwanted charge accumulated in the photo-diodes 51 is discharged to the substrate 53. When a predetermined time has elapsed since the output of the distance measuring light S3, an electric charge transfer signal (pulse signal) S5 is output, so that an electric charge accumulated in the photo-diodes 51 is transferred to the vertical transfer unit 52. Note that the electric charge transfer signal S5 is output after the pulse of the reflected light S4 is completed.

Thus, for a period $T_{U1}$ from the end of the output of the electric charge discharging signal S2 to the beginning of the output of the electric charge transfer signal S5, a signal charge corresponding to the distance from the camera body 10 to the measurement subject is accumulated. Namely, the electric charge accumulating period $T_{U1}$ is started at the same time as a period $T_S$ ends, for which the distance measuring light S3 is output, and during the electric charge accumulating period $T_{U1}$, only a part of the reflected light S4 is detected by the CCD 28. A signal charge S6, generated by the detected light beam, corresponds to the distance from the camera body 10 to the measurement subject. In other words, the signal charge S6, corresponding to a light beam, which is included in the reflected light beam S4 coming from the measurement subject and reaches the photo-diodes 51 within the electric charge accumulation period $T_{U1}$, is accumulated in the photo-diodes 51. The signal charge S6 is transferred to the vertical transfer unit 52 by the electric charge transfer signal S5.

After a predetermined time has elapsed since the output of the electric charge transfer signal S5, the electric charge discharging signal S2 is again output, so that unwanted charge, which is accumulated in the photo-diodes 51 after the transfer of the signal charge S6 to the vertical transfer unit 52, is discharged to the substrate 53. Thus, another charge is accumulated in the photo-diodes 51. Then, similarly to the above description, when the electric charge accumulation period $T_{U1}$ has again elapsed, the signal charge S6 is transferred to the vertical transfer unit 52.

The transferring operation of the signal charge S6 to the vertical transfer unit 52 is repeatedly performed until the next vertical synchronizing signal S1 is output. Thus, the signal charge S6 is integrated in the vertical transfer unit 52. The signal charge S6 integrated for one field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the three-dimensional image capturing device, as a three-dimensional image data of the measured subject.

The reflected light beam, sensed by the CCD 28 as described above, maybe affected by a reflectance of the surface of the measurement subject. Therefore, the distance information, obtained through the reflected light beam, may contain an error resulting from the reflectance. Further, the reflected light beam sensed by the CCD 28 may contain an extra component, such as ambient daylight, being other than the reflected light beam from the measurement subject, which can cause an error. Accordingly, in the distance information sensing operation, it is preferable that influences of the reflectance of the surface of the measurement subject, the ambient daylight and so on, are corrected. A distance information sensing operation, in which the correction is performed, is described below.

Figure 11B:
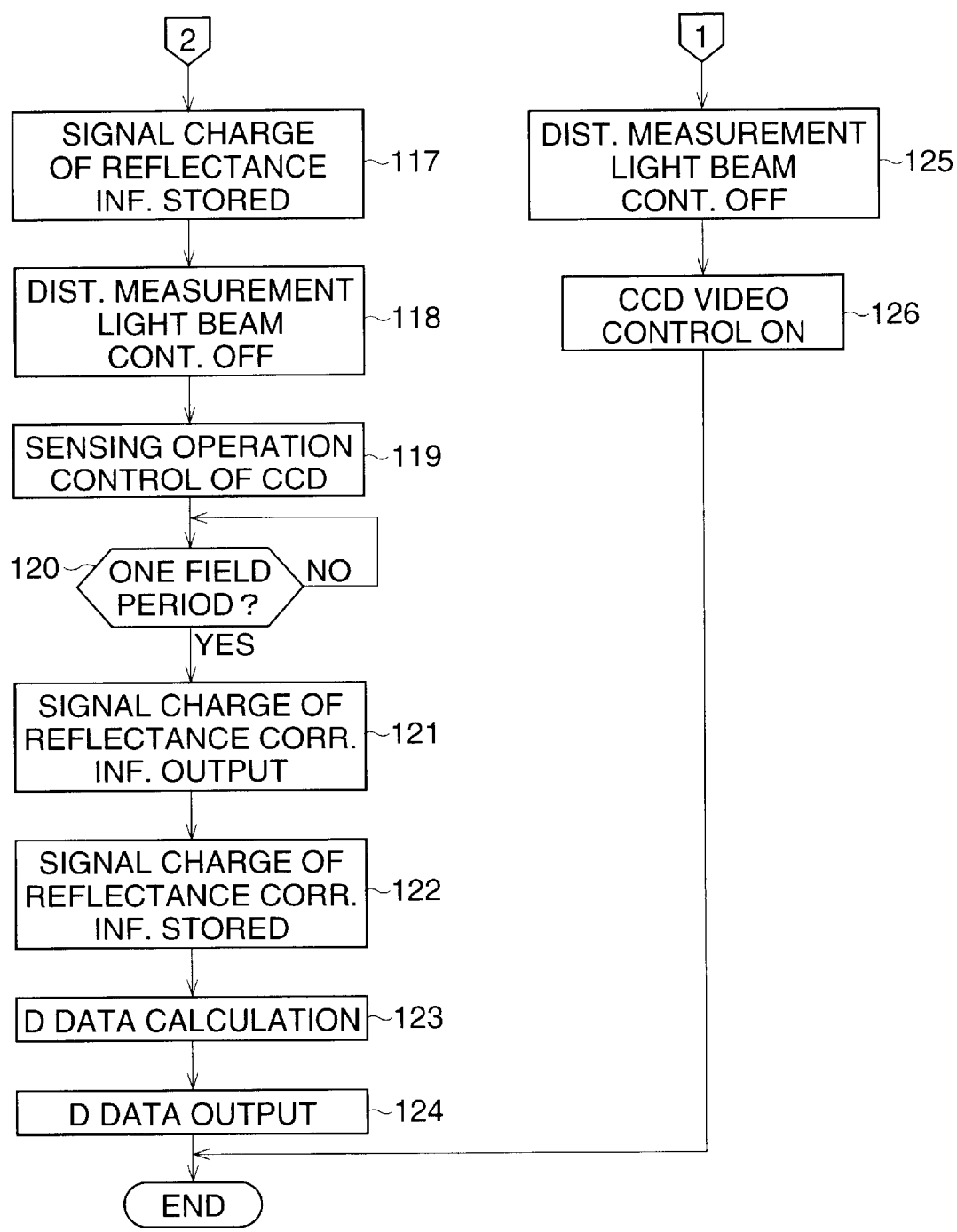

FIGS. 8, 9 and 10 show sensing operations of distance correction information, reflectance information and reflectance correction information, respectively. FIGS. 11A and 11B show a flowchart of the distance information sensing operation. With reference to FIGS. 1, 2, 7, 8, 9, 10, 11A and 11B, the distance information sensing operation, in which influences of the reflectance of the surface of the measurement subject, the ambient daylight and so on, are corrected, is described.

When it is recognized in Step 101 that the release switch 15 is fully depressed, Step 102 is executed in which it is determined which mode is selected, a video (V) mode or a distance measurement (D) mode. A change between the modes is carried out by operating the V/D mode switch 18.

When the D mode is selected, Step 103 is executed in which the vertical synchronizing signal S1 is output and a distance measuring light beam control is started. Namely, the light emitting device 14 is driven so that the distance measuring light beam S3 is intermit tingly output as a pulsed beam. Then, Step 104 is executed so that a sensing operation control of the CCD 28 is started. Namely, the distance information sensing operation described with reference to FIG. 7 is started, and thus the electric charge discharging signal S2 and the electric charge transfer signal S5 are alternately output, so that the signal charge S6 of the distance information is integrated in the vertical transfer unit 52.

In Step 105, it is determined whether one field period has elapsed since the beginning of the distance information sensing operation, i.e., whether a new vertical synchronizing signal S1 has been output. When one field period has passed, the process goes to Step 106 in which the signal charge S6 of the distance information is output from the CCD 28. The signal charge S6 is then stored in the image memory 34 in Step 107. Then, in Step 108, the distance measuring light beam control is turned OFF, and thus the light emitting operation of the light emitting device 14 is stopped.

In Steps 109 through 112, the distance correction information sensing operation is performed. In Step 109, as shown in FIG. 8, the vertical synchronizing signal S11 is output, and a sensing operation control of the CCD 28 is started. Namely, an electric charge discharging signal S12 and an electric charge transfer signal S15 are alternately output while the light emitting operation of the light emitting device 14 is not carried out, i.e., while the light source is not illuminated. Although the electric charge accumulation period $T_{U1}$ is the same as that of the distance information sensing operation shown in FIG. 7, the distance measuring light beam does not irradiate the measurement subject (reference S13), and thus there is no reflected light beam (reference S14). Therefore, although a signal charge of the distance information is not generated, a signal charge S16 corresponding to an interference or noise component is generated, since the noise component, such as ambient daylight, enters the CCD 28. The signal charge S16 corresponds to distance correction information, which is used for correcting an error generated in the distance information due to the noise component, and is related to the electric charge accumulation period $T_{U1}$.

In Step 110, it is determined whether one field period has elapsed since the beginning of the distance correction information sensing operation, i.e., whether a new vertical synchronizing signal S11 has been output. When one field period has passed, the process goes to Step 111 in which the signal charge S16 of the distance correction information is output from the CCD 28. The signal charge S16 is then stored in the image memory 34 in Step 112.

In Steps 113 through 117, the reflectance information sensing operation is performed. In Step 113, as shown in FIG. 9, a vertical synchronizing signal S21 is output, and a distance measuring light beam control of the CCD 28 is started, so that a distance measuring light beam S23 is intermittently output as a pulsed beam. In Step 114, a sensing operation control of the CCD 28 is started, and thus an electric charged is charging signal S22 and an electric charge transfer signal S25 are alternately output. The reflectance information sensing operation is controlled in such a manner that all of the reflected light beam S24 is received within an electric charge accumulation period $T_{U2}$, which is from an end of an output of the electric charge discharging signal S22 to a beginning of an output of the electric charge transfer signal S25. Namely, a width $T_S$ of the signal charge S26 accumulated in each of the photo-diodes 51 of the CCD 28 is the same as a width $T_S$ of the distance measuring light beam S23.

Therefore, the signal charge S26 does not depend upon the distance "r" of the measurement subject, and corresponds only to the reflectance information which depends on the reflectance of the surface of the measurement subject.

In Step 115, it is determined whether one field period has elapsed since the beginning of the reflectance information sensing operation, i.e., whether a new vertical synchronizing signal S21 has been output. When one field period has passed, the process goes to Step 116 in which the signal charge S26 of the reflectance information is output from the CCD 28. The signal charge S26 is then stored in the image memory 34 in Step 117. Then, in Step 118, the distance measuring light beam control is turned OFF, and thus the light emitting operation of the light emitting device 14 is stopped.

In Steps 119 through 122, the reflectance correction information sensing operation is performed. In Step 119, as shown in FIG. 10, a vertical synchronizing signal S31 is output, and a sensing operation control of the CCD 28 is started. Namely, an electric charge discharging signal S32 and an electric charge transfer signal S35 are alternately output while the light emitting operation of the light emitting device 14 is not carried out. Although the electric charge accumulation period $T_{U2}$ is the same as that of the reflectance information sensing operation shown in FIG. 9, the distance measuring light beam does not irradiate the measurement subject (reference S33), and thus there is no reflected light beam (reference S34). Therefore, although a signal charge of the reflectance information is not generated, a signal charge S36 corresponding to an interference component or a noise component is generated, since the noise component, such as ambient daylight, enters the CCD 28. The signal charge S36 corresponds only to reflectance correction information, which is used for correcting an error generated in the reflectance information due to the noise component, and is related to the electric charge accumulation period $T_{U2}$.

In Step 120, it is determined whether one field period has elapsed since the beginning of the reflectance correction information sensing operation, i.e., whether a new vertical synchronizing signal S31 has been output. When one field period has passed, the process goes to Step 121 in which the signal charge S36 of the reflectance correction information is output from the CCD 28. The signal charge S36 is stored in the image memory 34 in Step 122.

In Step 123, a calculation process of the distance measurement (D) data is performed using the distance information, the distance correction information, the reflectance information and the reflectance correction information, which are obtained in Steps 103 through 122. The D data is output in Step 124, and the sensing operation ends. Conversely, when it is determined in Step 102 that the V mode is selected, the distance measuring light beam control is turned OFF in Step 125, and a normal photographing operation (i.e., CCD video control) using the CCD 28 is turned ON in Step 126. Then, the sensing operation ends.

With reference to FIGS. 7 through 10, the contents of the calculation executed in Step 123 are described below.

It is supposed that the measurement subject of reflectance R is illuminated and an image of the measurement subject is formed on the CCD 28 while deeming that the measurement subject is a secondary light source. At this time, an output Sn, which is obtained by integrating an electric charge generated in a photo-diode for an electric charge accumulation period "t", is indicated as follows:

$$Sn = k \cdot R \cdot I \cdot t \tag{2}$$

wherein "k" is a proportional coefficient, which is varied in accordance with an F-number and a magnification of the photographing lens.

When the measurement subject is illuminated by light output from a light source, such as an infrared laser source, the luminance I is obtained by combining a luminance $I_s$ due to the light source, with a luminance $I_B$ due to the ambient daylight, which is indicated as follows:

$$I = I_S + I_B \tag{3}$$

As shown in FIG. 7, it is supposed that the electric charge accumulation period is $T_{U1}$, the pulse width of the distance measuring light beam S3 is $T_S$, a pulse width of the signal charge S6 of the distance information is $T_D$, and the electric charge accumulation period is repeated N times for one field period. An output $SM_{10}$ of the CCD is:

$$SM_{10} = \Sigma(k \cdot R(I_S \cdot T_D + I_B \cdot T_{U1})) \tag{4}$$

$$= k \cdot N \cdot R(I_S \cdot T_D + I_B \cdot T_{U1})$$

wherein the pulse width $T_D$ is indicated as follows:

$$T_D = T_{U1} - \delta \cdot t \tag{5}$$

$$= T_{U1} - 2r/C$$

As shown in FIG. 9, when the electric charge accumulation period $T_{U2}$ is greater than the pulse width $T_S$, such that the electric charge accumulation period $T_{U2}$ is large enough to receive the whole of the reflected light beam, an output $SM_{20}$ of the CCD is:

$$SM_{20} = \Sigma(k \cdot R(I_S \cdot T_S + I_B \cdot T_{U2})) \tag{6}$$

$$= k \cdot N \cdot R(I_S \cdot T_S + I_B \cdot T_{U2})$$

As shown in FIG. 8, when the light beam is turned OFF to carry out a pulse-shaped electric charge accumulation, having a same width as that of FIG. 7, an output $SM_{11}$ of the CCD is:

$$SM_{11} = \Sigma(k \cdot R \cdot I_B \cdot T_{U1}) \tag{7}$$

$$= k \cdot N \cdot R \cdot I_B \cdot T_{U1}$$

Similarly, an output $SM_{11}$ of the CCD, which is obtained when an electric charge accumulation shown in FIG. 10 is performed, is:

$$SM_{21} = \Sigma(k \cdot R \cdot I_B \cdot T_{U2}) \tag{8}$$

$$= k \cdot N \cdot R \cdot I_B \cdot T_{U2}$$

Based on the formulas (4), (6), (7) and (8), a following formula is obtained:

$$S_D = (SM_{10} - SM_{11})/(SM_{20} - SM_{21}) \tag{9}$$

$$= T_D/T_S$$

As described above, the distance measuring light beam S3 and the reflected light beam S4 contain noise, such as ambient daylight (i.e., a luminance $I_B$ due to ambient daylight). $T_D/T_S$ included in the formula (9) indicates that an amount of the reflected light beam S4 from the measurement subject, when the distance measuring light beam S3 is radiated, is normalized by an amount of the distance measuring light beam S3, and is equal to a ratio of a value in which the noise component ($SM_{11}$) (corresponding to the electric charge S16 shown in FIG. 8) is subtracted from the amount of the distance measuring light beam S3 ($SM_{10}$) (corresponding to the signal charge S6 shown in FIG. 7), to a value in which the noise component ($SM_{21}$) (corresponding to the electric charge S36 shown in FIG. 10) is subtracted from an amount of the reflected light beam S4 ($SM_{20}$) (corresponding to the signal charge S26 shown in FIG. 9).

$SM_{10}$, $SM_{11}$, $SM_{20}$ and $SM_{21}$ included in the formula (9) are stored as the distance information, the distance correction information, the reflectance information and the reflectance correction information, in Steps 107, 112, 117 and 122, respectively. Therefore, based on the information, $T_D/T_S$ is obtained. Since the pulse width $T_S$ is known, the distance "r" is obtained from formula (5) and $T_D/T_S$.

Thus, based on the formula (5) and (9), the distance "r" from the camera body to each point on the surface of the measurement subject is corrected, so that an accuracy of a distance sensing is improved.

Figure 12:
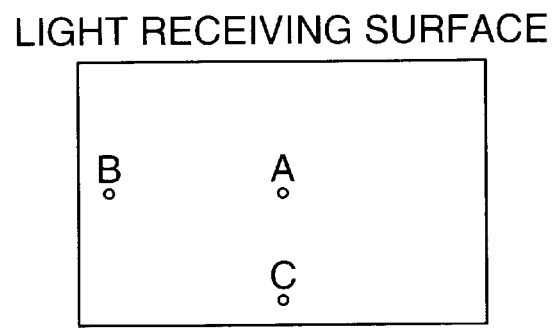
FIG. 12 is a view showing a light receiving surface of the CCD.
Figure 13:
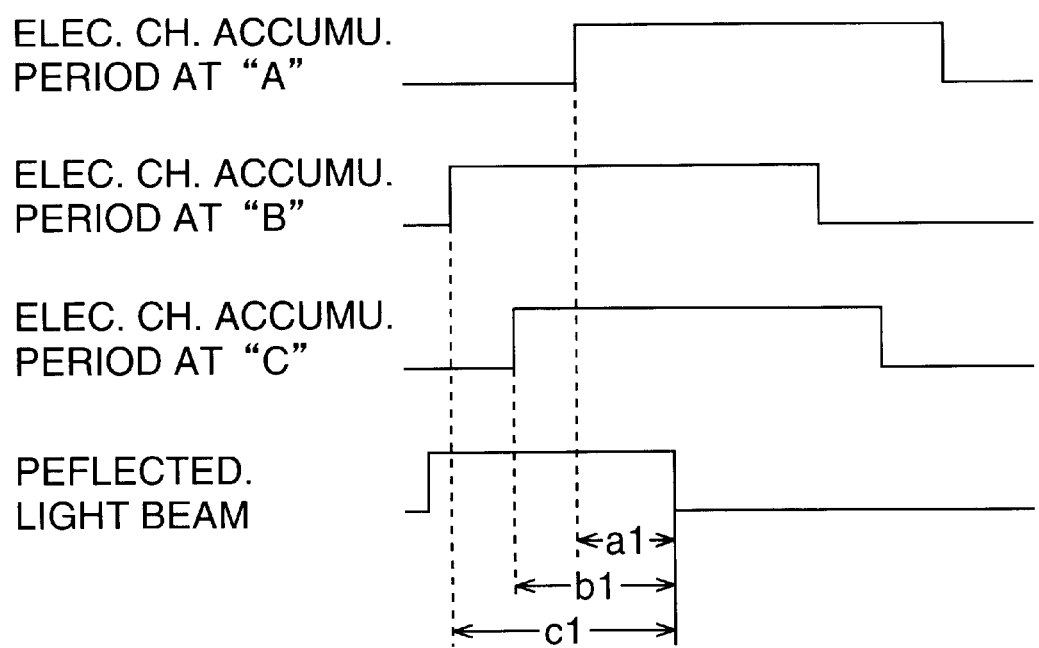
FIG. 13 is a view showing differences of the electric charge accumulation periods on points of the light receiving surface.

FIG. 12 shows a light receiving surface of the CCD 28, and FIG. 13 shows differences of the electric charge accumulation periods on points of the light receiving surface.

For example, at different points on the light receiving surface, such as a central portion A, a mid point B of the left edge, and a mid point C of the lower edge, output timing of the electric charge discharging signals S2, S12, S22 and S32 and the electric charge transfer signals S5, S15, S25 and S35 may not coincide with each other. Namely, as shown in FIG. 13, the electric charge accumulation periods at the points A, B and C may shift and be different from each other.

The differences are derived from several factors including dispersion of the length of hard-wire, the resistance value and so on in each point on the substrate 53 (see FIG. 6).

Theoretically, when each point on the surface of the measurement subject is located at the same distance from the photographing lens of the camera, i.e., when the surface is concave or part of inner wall of a semi-sphere and the center of curvature of the surface coincides with the photographing lens, the reflected light beam is received simultaneously at each point on the light receiving surface, therefore there is no substantial shift in the light receiving timing at each point. Accordingly, if the electric charge accumulation period is different from each other in each point on the light receiving surface, as understood from FIG. 13, differences occur in the amounts a1, b1 and c1 of the reflected light beam in each point. As a result, even if a measurement subject has a concave surface, which faces the camera (i.e., the three-dimensional image capturing device) and the center of curvature coincides with the photographing lens, and the concave surface is substantially parallel to the CCD, differences occur in the light receiving amounts a1, b1 and c1, so that the camera cannot sense that the surface is concave.

Therefore, in this embodiment to sense the error caused by the dispersion of the electric charge accumulation period so that the distance information is corrected, prior to sensing the distance information of the measurement subject, a distance measurement is performed using a standard subject to which the distance from the camera to each point on a surface of the standard subject is known, so that an error or correction data is sensed.

Figure 14:
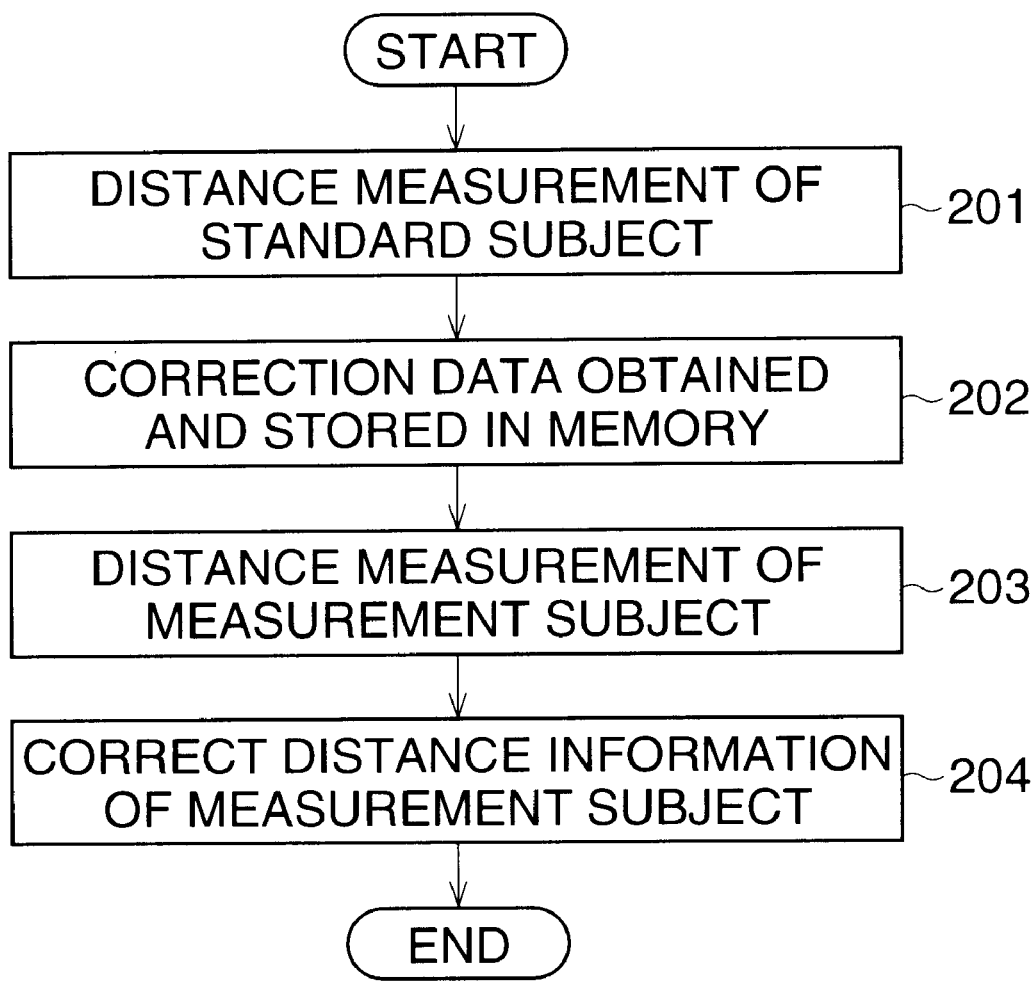
FIG. 14 is a flowchart showing a distance information sensing process in which correction data is sensed, and distance information of a measurement subject is corrected using the correction data.

FIG. 14 is a flowchart showing a distance information sensing process in which the correction data is sensed, and the distance information of the measurement subject is corrected using the correction data.

In Step 201, a distance measurement is performed for the standard subject. In the embodiment, the standard subject has a concave surface, in which the center of curvature coincides with the photographing optical system, and which is substantially perpendicular to the optical axis of the photographing optical system of the camera. Namely, the positional relationship between the standard subject and the camera is identical with that between the measurement subject S and the distance measurement device B shown in FIG. 3. The distance measurement is carried out according to the distance information sensing operation shown in FIGS. 11A and 11B, so that normalized distance information is obtained based on the distance correction information, the reflectance information and the reflectance correction information.

In Step 202, correction data is obtained based on the distance information obtained in Step 201. It is supposed that the distance information, obtained from electric charges accumulated in photo-diodes at the points A, B and C, for example, shown in FIG. 12, are $\gamma_{AO}$, $\gamma_{BO}$ and $\gamma_{CO}$, respectively, and the distance from the CCD 28 (FIG. 2) to the surface of the standard subject is "a". Errors (i.e., the correction data) in the photo-diodes of the points A, B and C are expressed as follows:

$$\Delta\gamma_{AO} = \gamma_{AO} - a \quad (10)$$

$$\Delta\gamma_{BO} = \gamma_{BO} - a \quad (11)$$

$$\Delta\gamma_{CO} = \gamma_{CO} - a \quad (12)$$

The correction data is sensed for each of the photo-diodes, and are stored in the memory 35a.

In Step 203, a distance measurement is carried out for the measurement subject, to which the distance from the camera to each point on a surface of the measurement subject is unknown. The distance measurement is performed according to the distance information sensing process shown in FIGS. 11A and 11B, in a similar way as that in Step 201, so that normalized distance information is obtained based on the distance correction information, the reflectance information and the reflectance correction information.

In Step 204, the distance information obtained in Step 203 is corrected using the correction data stored in the memory 35a in Step 202. For example, when it is supposed that the distance information, obtained from electric charges accumulated in photo-diodes at the points A, B and C, are $\gamma_A$, $\gamma_B$ and $\gamma_C$, respectively, the corrected distance information are expressed as follows:

$$\Gamma_A = \gamma_A - \Delta\gamma_{AO} \quad (13)$$

$$\Gamma_B = \gamma_B - \Delta\gamma_{BO} \quad (14)$$

$$\Gamma_C = \gamma_C - \Delta\gamma_{CO} \quad (15)$$

As described above, according to the embodiment, even if the timing of the discharging operation and the transfer operation in each photo-diode of the CCD are different from each other, the distance information is corrected using the correction data, so that errors occurring while sensing the three-dimensional shape of the measurement subject can be drastically reduced.

Note that the shape of the standard subject may be arbitrarily chosen, and can be a flat or an inclined plane.

Although the embodiments of the present invention have been described herein with reference to the accompanying drawings, obviously many modifications and changes maybe be made by those skilled in this art without departing from the scope of the invention.

The present disclosure relates to subject matter contained in Japanese Patent Application No. 11-332843 (filed on Nov. 24, 1999) which are expressly incorporated herein, by reference, in its entirety.

What is claimed is:

1. A three-dimensional image capturing device, comprising:

a light source that irradiates a distance measuring light beam to a standard subject, to which the distance from said device to a surface of said standard subject is known, and a measurement subject, to which the distance from said device to a surface of said measurement subject is unknown, said distance measuring light beam being a pulsed beam, said measurement subject reflecting said distance measuring light beam to generate a reflected light beam pulse;

a plurality of photoelectric conversion elements that receive said reflected light beam pulse coming from said standard subject and said measurement subject, so that electric charge corresponding to an amount of said received reflected light beam is accumulated in each of said photoelectric conversion elements;

a signal charge holding unit disposed adjacent to each of said photoelectric conversion elements;

an electric charge discharging processor that discharges unwanted charge accumulated in each of said photoelectric conversion elements, so that an accumulating operation of signal charge is started in each of said photoelectric conversion elements;

a signal charge transfer processor that transfers said signal charge accumulated in said photoelectric conversion elements to said signal charge holding unit;

a signal charge integrating processor that drives said electric charge discharging processor and said signal charge transfer processor alternately to integrate said signal charge in said signal charge holding unit, so that distance information, corresponding to a distance from said device to said surface of each of said standard subject and said measurement subject, is sensed; and an error sensing processor that senses an error of said distance information to said measurement subject, based on said signal charge integrated in said signal charge integrating processor when using said standard subject.

2. A device according to claim 1, further comprising a memory in which said error is stored.

3. A device according to claim 1, wherein said error is sensed for each of said plurality of photoelectric conversion elements.

4. A device according to claim 1, further comprising a distance information correcting processor that corrects said distance information sensed by said signal charge integrating processor, by the amount of said error.

5. A device according to claim 1, wherein said signal charge integrating processor drives said electric charge discharging processor and said signal charge transfer processor at a timing the same as that of an operation by which said distance information is sensed, while said light source is turned OFF, so that distance correction information is sensed, said signal charge integrating processor drives said electric charge discharging processor and said signal charge transfer processor in such a manner that said photoelectric conversion elements receive all of said reflected light beam, so that reflectance information is sensed, and said signal charge integrating processor drives said electric charge discharging processor and said signal charge transfer processor at a timing the same as that of an operation by which said reflectance information is sensed, while said light source is turned OFF, so that reflectance correction information is sensed.

6. A device according to claim 5, wherein normalized distance information $S_D$ is sensed by the following formula, $$S_D = (SM_{10} - SM_{11})/(SM_{20} - SM_{21})$$

wherein said distance information is $SM_{10}$, said distance correction information is $SM_{11}$, said reflectance information is $SM_{20}$, and said reflectance correction information is $SM_{21}$.

7. A device according to claim 1, wherein said photoelectric conversion elements are formed on a substrate, and said electric charge discharging processor discharges said unwanted charge to said substrate.

8. A device according to claim 1, wherein said signal charge holding unit is provided in a vertical transfer unit that outputs said signal charge from said three-dimensional image capturing device.

* * * * *